United States Patent

Melot et al.

[11] Patent Number: 5,936,044
[45] Date of Patent: *Aug. 10, 1999

[54] FILMS BASED ON POLYAMIDE AND ON POLYMERS CONTAINING POLYAMIDE BLOCKS AND POLYETHER BLOCKS

[75] Inventors: Denis Melot, Bernay; Patrick Alex, Limours-Pecquese, both of France

[73] Assignee: Elf Atochem S.A., Puteaux, France

[*] Notice: This patent issued on a continued prosecution application filed under 37 CFR 1.53(d), and is subject to the twenty year patent term provisions of 35 U.S.C. 154(a)(2).

[21] Appl. No.: 08/669,347

[22] PCT Filed: Dec. 1, 1995

[86] PCT No.: PCT/FR95/01586

§ 371 Date: Oct. 15, 1996

§ 102(e) Date: Oct. 15, 1996

[87] PCT Pub. No.: WO96/17003

PCT Pub. Date: Jun. 6, 1996

[30] Foreign Application Priority Data

Dec. 2, 1994 [FR] France .................................. 94 14521

[51] Int. Cl.$^6$ ................................ C08L 77/00; C08J 5/18
[52] U.S. Cl. .............................................................. 525/432
[58] Field of Search ............................................... 525/432

[56] References Cited

U.S. PATENT DOCUMENTS 4,970,274 11/1990 Chacko et al. ........................... 525/432
5,239,004 8/1993 Pyke et al. ............................... 525/184

FOREIGN PATENT DOCUMENTS 63-063748 3/1988 Japan .
655941 5/1986 Switzerland .

*Primary Examiner*—Nathan M. Nutter
*Attorney, Agent, or Firm*—Pennie & Edmonds LLP

[57] ABSTRACT

The invention relates to films based on PA-6 or PA-6,6 and on a copolymer containing polyamide (6 or 6,6) blocks and ploytetramethylene glycol blocks. They have greater impact strengths than PA-6 or PA-6, 6 film.

7 Claims, No Drawings

FILMS BASED ON POLYAMIDE AND ON POLYMERS CONTAINING POLYAMIDE BLOCKS AND POLYETHER BLOCKS

This application is a continuation of PCT/FR95/01586, filed Dec. 1, 1995, and now under 35 USC 371.

DESCRIPTION

The present invention relates to films based on polyamide and on polymers containing polyamide blocks and polyether blocks.

Prior art JP 04-314 741 describes films consisting of a mixture of (i) polyamide 6 and (ii) of polyetheresteramide. The polyetheresteramide is a block polymer obtained by the condensation of polyoxytetramethylene glycol and of polyamide blocks with carboxylic acid ends. The polyamide blocks originate from polycaprolactam (PA-6) or from polydodecalactam (PA-12). The quantity of polyetheresteramide is between 0.5 and 9% by weight of the mixture.

The property of this film is that it resists folding at 0° C. according to method 101c of the standard MIL-B-131 F. The number of holes produced in the course of 1000 foldings is measured.

If the quantity of polyetheresteramide is too small the perforation is considerable; if the quantity of polyetheresteramide is too great, the transparency and the mechanical properties of the film are reduced.

In this prior art the polyetheresteramide is such that the proportions by weight of the polyamide blocks and the polyether blocks are in the ratio 45/55 to 30/70.

It is useful that the polyamide films which are employed in the foodstuffs industry should have a good resistance to folding, especially at low temperature for the packaging of deep-frozen products. However, it is indispensable that the films for packaging the products which are deep-frozen (or to be deep-frozen) should resist the perforation due to the projecting parts or to the sharp edges of these products. It is also useful that, during the transport and the handling of the deep-frozen product, the said projecting parts and sharp edges should not cause the film to be perforated.

This property is also sought after for the packaging of sterilized medical equipment. In fact, perforation of the film would cause an entry of air and hence a contamination. The Applicant found that the most representative test of this resistance was the impact strength, according to ISO Standard 7765-1 (Method B), the impact being that of a punch falling from a certain height onto the film.

The Applicant has found films based on (i) polyamide consisting essentially of polyamide-6 or of polyamide-6,6 and (ii) on a polymer containing polyamide blocks and polyether blocks, the polyamide blocks consisting essentially of polyamide-6 or of polyamide-6,6, the polyether blocks consisting essentially of polytetramethylene glycol, the polyamide/polyether ratio by weight of (ii) being higher than or equal to 50/50.

The main advantage of these films is that they have an impact strength according to ISO 7765-1 (Method 3) which is superior to that of the same polyamide film.

The prior art JP 04-314 741 referred to above has described closely related compositions; however, they do not have a sufficient impact strength.

U.S. Pat. No. 4 970 274 describes moulding materials and films of polyamide-6 containing polymers with polyamide blocks and polyether blocks. However, the combination of they polyamide-6 blocks with the polytetramethylene glycol (PTMG) blocks is neither mentioned nor exemplified. The Applicant has found that this combination provides particular results, namely an impact strength while retaining the tensile strength and the tearing resistance of a polyamide-6 (PA-6) or polyamide-6,6 (PA-6,6) film. The films of the invention have a structure of a polyamide matrix in which nodules of polymers containing polyamide blocks and polyether blocks are dispersed.

These nodules are smaller than 0.3 $\mu$m.

Prior art U.S. Pat No. 4 970 274 shows that the polyamide compositions have been made more supple but with a loss in the mechanical properties such as, for example, the tensile strength, whereas in the present invention the impact strength has been improved without loss of the other properties.

Another advantage of the invention is that the polyamide and the polymer containing polyamide blocks and polyether blocks mix very easily, for example in the extruder which feeds the machine for producing the film. It suffices to prepare a simple dry drum mix (or dry blend); it is not necessary to carry out a compounding operation, with or without a master batch, with special screw profiles.

Polyamide-6 is the product of condensation of caprolactam or of aminocaproic acid; polyamide-6,6 is the product of condensation of adipic acid and of hexamethylene diamine.

It would not constitute a departure from the scope of the invention if the PA-6 or the PA-6,6 were to contain small quantities of other polyamides, that is to say less than 30&% by weight. These other polyamides may be chosen from the condensation products:

of one or more amino acids, such as aminocaproic, 7-aminoheptanoic, 11-aminoundecanoic and 12-aminododecanoic acids, of one or more lactams such as caprolactam, oenantholactam and lauryllactam;

of one or more salts or mixtures of diamines such as hexamethylenediamine, dodecamethylenediamine, meta-xylylenediamine, bis-p-aminocyclohexylmethane and trimethylhexamethylene diamine, with diacids such as isophthalic, terephthalics, adipic, azelaic, suberic, sebacis and dosecanedicarboxylic acids;

or of mixtures of several of these monomers, which results in copolyamides such as, for example, PA-6,10 and PA-6,12.

The polyamide (i) (PA-6 or PA-6,6) may also contain in its chain small quantities of other monomers of polyamides, that is to say less than 30% by weight.

For example, PA-6 may contain lauryllactam, isophthalic, terephthalic or hexamethylene diamine units.

Within the meaning of the invention the polyamide (i) also denotes mixtures containing a PA-6 or PA-6,6 matrix with polyolefins.

Such mixtures are described in U.S. Pat. No. 5,342,886. Mixtures of polyamides and of copolymers of Such mixtures are described, for example, in U.S. Pat. No. 5,070,145 and EP 564 338.

The polymers (ii) containing polyamide blocks and polyether blocks result from the copolycondensation of polyamide sequences containing reactive ends with polyether sequences containing reactive ends, such as, among others:

1) Polyamide sequences containing diamine chain ends with polyoxyalkylene sequences containing dicarboxylic chain ends.

2) Polyamide sequences containing dicarboxylic chain ends with polyoxyalkylene sequences containing diamine chain ends obtained by cyanoethylation and hydrogenation of aliphatic alpha-omega-dihydroxylated polyoxyalkylene sequences called polyetherdiols.

3) Polyamide sequences containing dicarboxylic chain ends with polyetherdiols, the products obtained in this particular case being polyetheresteramides.

The polyamide sequences containing dicarboxylic chain ends originate, for example, from the condensation of alpha-omega-aminocarboxylic acids or of dicarboxylic acids and diamines in the presence of a tricarboxylic acid chain limiter.

The number-average molecular mass $\overline{M}_n$ of the polyamide sequences is between 300 and 15 000 and preferably between 600 and 5000. The mass $\overline{M}_n$ of the polyether sequences is between 100 and 6000 and preferably between 200 and 3000.

The polymers containing polyamide blocks and polyether blocks may also include units distributed randomly. These polymers may be prepared by the simultaneous reaction of the polyether and of the precursors of the polyamide blocks.

For example, it is possible to react polyetherdiol, a lactam (or an alpha,omega-amino acid) and a diacid chain limiter in the presence of a little water. A polymer is obtained which has essentially polyether blocks, polyamide blocks of very variable length, as well as the various reactions which have reacted randomly, which are distributed statistically along the polymer chain.

These polymers containing polyamide blocks and polyether blocks, whether originating from the copolycondensation of polyamide and polyether sequences prepared beforehand or from a single-stage reaction, exhibit, for example, Shore D hardness values which may be between 20 and 75 and advantageously between 30 and 70 and an intrinsic viscosity between 0.8 and 2.5, measured in meta-cresol at 250° C. at an initial concentration of 0.8 g/100 ml.

These polymers containing polyamide and polyether blocks are described in U.S. Pat. No. 4,331,786, U.S. Pat. No. 4,115,475, U.S. Pat. No. 4,195,015, U.S. Pat. No. 4,839,441, U.S. 4,864,014, U.S. Pat. No. 4,230,838 and U.S. Pat. No. 4,332,920.

The polyamide blocks consist essentially of PA-6 or of PA-6,6 and, like the polyamides (i), they may include other polyamides as a mixture or other polyamide units in their chain. The polyether blocks consist of $-O-(CH_2)_4-$ units; whether these blocks in the polymer (ii) originate from the reaction of polyether diamine with polyamide blocks containing acids ends or from the reaction of polyetherdiols with polyamide blocks containing acid ends, they are called, simply, "PTMG blocks" (polytetramethylene glycol or polyoxytetramethylene glycol).

The polymer containing polyamide blocks and polyether blocks is such that the polyamide is the major constituent by weight, that is to say that the quantity of polyamide which is in the form of blocks and that which is possibly distributed statistically in the chain represents more than 50% by weight of the polymer containing polyamide blocks and polyether blocks. The quantity of polyamide and the quantity of polyether are advantageously in the (polyamide/polyether) ratio of 50/50 to 95/5 and preferably 60/40 to 75/25.

The polymer (ii) may also be a mixture of two or more polyamide block and polyether block polymers.

The same polyamide as the polyamide (i) constituting the film is advantageously chosen for the polyamide blocks of (ii).

The film of the invention may be prepared by mixing the polyamide and the polymer containing polyamide blocks and polyether blocks in the molten state, followed by extrusion blowing or by extrusion in a flat and cylinder die.

The quantity of polymer containing polyamide and polyether blocks is a function of the impact strength which is sought. The impact strength increases with the quantity. This quantity may be up to 40 parts per 100 parts of polyamide and advantageously 5 and 30 parts per 100 parts of polyamide.

The impact strength of a polyamide film of thickness between 15 and 300 $\mu$m can be increased 1,1-fold and more generally by a factor of between 1.2 and 2.

The Applicant has found that the compositions for manufacturing films of the invention can be obtained in the extruder which feeds the device for manufacturing the film. It suffices to feed the extruder with the polyamide (i) and the block polymer (ii) without it being necessary to blend them beforehand or to prepare a master batch of (ii) on (i) and then to incorporate it into (i).

The Applicant has found that the mixture with a major proportion of polyamide and a minor proportion of polymer containing polyamide blocks and polyether blocks is in the form of a polyamide matrix and of nodules of at most 0.3 $\mu$m and advantageously <0.2 of polymer containing polyamide blocks and polyether blocks. The nodules are dispersed very easily; it is not necessary to employ specials screws, twin screws or special profiles.

In so far as the mixtures of PA-6 and of copolymer containing blocks derived from caprolactam and polyether blocks are concerned, the nodules are approximately 0.1 $\mu$m.

Polymers containing blocks derived from caprolactam and polytetramethylene glycol blocks are preferred.

The Applicant also found that the transparency of the polyamide film was not affected by the addition of polymer containing polyamide blocks and polyether blocks in proportions of up to 30 parts per 100 parts of polyamide; it is even slightly improved.

EXAMPLE 1

The impact strength of a PA-6 film containing various proportions of a polymer containing polyamide 6 blocks of mass $\overline{M}_n$ 1300 and polyoxytetramethylene glycol blocks of mass $\overline{M}_n$=650 was measured according to ISO 7765-1 (Method B) (punch impact height 152.4 cm). This block polymer is call PEBAX 1 in the remaining examples; its Shore D hardness is 55.

The PA-6 is of MI 2 to 3 (235° C. −2.16 kg−∅=2 mm). 0.1 $\mu$m nodules are observed in a PA-6 matrix.

The tests are done on a 55-$\mu$m film conditioned for 12 hours at 23° C. in an atmosphere of 50% relative humidity.

TABLE 1

| | Values for 50% breakage | | |
|---|---|---|---|
| PA-6 parts | PEBAX 1 parts | Weight (*) (grams) | Transmittance at 700 (nm) |
| 100 | 0 | 600 to 700 | 81% |
| 95 | 5 | 800 to 900 | 81% |
| 90 | 10 | 800 to 900 | 83% |
| 85 | 15 | 900 to 1000 | 83% |

(*) the weight of the punch: 345 g not included.

EXAMPLE 2

The mechanical properties of films of example 1 are measured. The results are in Table 2.

It is found that the mechanical properties are not impaired by the addition of PEBAX 1, whereas it could have been expected that the film would be too extensible and too elastic.

TABLE 2

PA6/PEBAX 1 FILMS

|  | Units | PA 6 alone | PA 6 + 5% PEBAX 1 | PA 6 + 10% PEBAX 1 | PA 6 + 15% PEBAX 1 |
|---|---|---|---|---|---|
| Tear resistance (NOTCHED) |  |  |  |  |  |
| parallel direction | cN | 64 | 74 | 220 | 98 |
| perpendicular direction | cN | 67 | 85 | 98 | 100 |
| Tensile test parallel direction |  |  |  |  |  |
| yield deformation | % | 19 | 21 | 20 | 21 |
| yield stress | MPa | 31 | 26 | 29 | 28 |
| break deformation | % | 288 | 317 | 304 | 290 |
| break stress | MPa | 71 | 77 | 74 | 69 |
| perpendicular direction |  |  |  |  |  |
| yield deformation | % | 12 | 11 | 13 | 14 |
| yield stress | MPa | 33 | 36 | 36 | 32 |
| break deformation | % | 300 | 295 | 314 | 305 |
| break stress | MPa | 67 | 58 | 63 | 54 |

We claim:

1. A film based on (i) a polyamide consisting essentially of polyamide-6 or polyamide-6,6 and (ii) a polymer containing polyamide blocks and polyether blocks, and having a structure of a polyamide matrix in which nodules of the polymer (ii) are dispersed, wherein the nodules of the polymer (ii) are smaller than 0.3 μm; the polyamide blocks consisting essentially of polyamide-6 or polyamide-6,6 and the polyether blocks consisting essentially of polytetramethylene; and the ratio of the polyamide/polyether in the polymer (ii) is in the range of from 50/50 to 95/5.

2. The film according to claim 1, wherein the impact strength according to ISO 7765-1 (Method B) is higher than that of a film based on polyamide consisting essentially of polyamide-6, or polyamide-6,6.

3. The film according to claim 1, wherein the transparency is at least equal to that of a film based on polyamide consisting essentially of polyamide-6, or polyamide-6,6.

4. The film according to claim 1, wherein the ratio of polyamide/polyether in the polymer (ii) is in the range of between 60/40 and 75/25.

5. The film according to claim 2, wherein the ratio of the polyamide/polyether in the polymer (ii) is in the range of between 60/40 and 75/25.

6. The film according to claim 1, wherein the polyamide in (i) is the same as in the polyamide blocks of (ii).

7. The film according to claim 1, wherein the nodules of the polymer (ii) are about 0.1 μm.

* * * * *